United States Patent
Kolak et al.

(10) Patent No.: US 8,645,394 B1
(45) Date of Patent: Feb. 4, 2014

(54) RANKING CLUSTERS AND RESOURCES IN A CLUSTER

(75) Inventors: Okan Kolak, Sunnyvale, CA (US);
Bryan Horling, Sunnyvale, CA (US);
Beverly Yang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 13/088,154

(22) Filed: Apr. 15, 2011

(51) Int. Cl.
*G06F 17/30* (2006.01)

(52) U.S. Cl.
USPC .......................................................... 707/748

(58) Field of Classification Search
USPC ................................................. 707/737, 748
See application file for complete search history.

(56) References Cited

U.S. PATENT DOCUMENTS

| | | | |
|---|---|---|---|
| 6,285,999 B1 | 9/2001 | Page | |
| 7,505,961 B2 * | 3/2009 | Finger, II | 1/1 |
| 7,603,350 B1 | 10/2009 | Guha | |
| 8,090,717 B1 * | 1/2012 | Bharat et al. | 707/731 |
| 8,185,523 B2 * | 5/2012 | Lu et al. | 707/723 |
| 2008/0183695 A1 * | 7/2008 | Jadhav | 707/5 |
| 2009/0062136 A1 * | 3/2009 | Young et al. | 506/8 |
| 2009/0307213 A1 * | 12/2009 | Deng et al. | 707/5 |
| 2010/0082618 A1 * | 4/2010 | Ott et al. | 707/730 |
| 2011/0040768 A1 * | 2/2011 | Shon et al. | 707/749 |
| 2011/0246484 A1 * | 10/2011 | Dumais et al. | 707/749 |

FOREIGN PATENT DOCUMENTS

WO   WO 2004/088475   10/2004

OTHER PUBLICATIONS

Kamvar et al., "Exploiting the Block Structure of the Web for Computing PageRank," Stanford University (2003).
Wu et al., "Topical TrustRank: Using Topicality to Combat Web Spam," Department of Computer Science & Engineering, Lehigh University (2006).

* cited by examiner

*Primary Examiner* — Jorge A Casanova
(74) *Attorney, Agent, or Firm* — Fish & Richardson P.C.

(57) ABSTRACT

Methods, systems, and apparatus, including computer programs encoded on a computer storage medium, for ranking resources within clusters of resources, and for ranking the clusters. In one aspect, a method includes accessing a cluster of a plurality of resources associated with a name context; generating a quality score for a resource; generating a resource ranking score for the resource, with the resource ranking score at least partly based on the quality score and the cluster relation score; and ranking the resources in the cluster at least partly based on the resource ranking score.

23 Claims, 6 Drawing Sheets

RANKING CLUSTERS AND RESOURCES IN A CLUSTER

BACKGROUND

The specification relates to information retrieval.

The Internet provides access to a wide variety of resources, for example, personal profile pages, video files, image files, audio files, or Web pages including content for particular subjects, book articles, or news articles. A search system can select one or more resources in response to receiving a search query. Numerous different types of search queries may exist, including, e.g., search queries for products, books, people, and so forth.

In an example, a search query may include a search for the name of a person ("person name"), or be in a context related to a person. As most person names are not unique, an initial search on a person name can yield multiple search results that each reference resources describing different persons. For example, a search on the name of "John Smith" may yield search results that reference resources with information about an explorer, resources about a botanist and curator of Kew Gardens, resources about a professional wrestler, and still other resources about other people that are named "John Smith." In this example, the search results are ranked and ordered (e.g., based on a relevance to the search query) and returned to a user. Generally, the search system selects and scores resources based on their relevance to the search query and on their importance relative to other resources to provide search results that link to the selected resources. The search results are typically ordered according to the scores.

SUMMARY

In general, one aspect of the subject matter described in this specification can be embodied in methods that include the actions of accessing a cluster of a plurality of resources associated with a name context; generating a quality score for a resource, the quality score being independent of inclusion of the resource in the cluster and independent of inclusion of other resources in the cluster and indicative of a quality measure of the resource; generating a cluster relation score for the resource, the cluster relation score being dependent on the other resources in the cluster and indicative of an authority of the resource in relation to the other resources in the cluster; generating a resource ranking score for the resource, with the resource ranking score at least partly based on the quality score and the cluster relation score; and ranking the resources in the cluster at least partly based on the resource ranking score.

Aspects of the disclosure may include one or more of the following features. In some aspects, the quality score is at least partly based on one or more of a relevance of the resource to the name context, an age attribute of the resource, an authority attribute of the resource, a spam score associated with the resource, and a number of other clusters to which the resource belongs. In other aspects, the resource includes a first resource, and wherein the cluster relation score is at least partly based on a connectivity of the first resource to a second resource in the cluster.

In still other aspects, the resource includes a first resource, and wherein the cluster relation score is at least partly based on a conflict between the first resource and a second resource in the resources of the cluster, wherein a conflict occurs when the first resource is of a particular resource type and the second resource is of the same, non-duplicative resource type. In some aspects, the method includes applying a linear weighted regression to the quality score and to the cluster relation score, wherein the linear weighted regression includes an additive function in which (a) the quality score is multiplied by a first weight, (b) the cluster relation score is multiplied by a second weight value, and (c) a value of the quality score multiplied by the first weight is added to a value of the cluster relation score multiplied by the second weight.

In other aspects, the method includes decreasing the cluster relation score for the resource based on a quality score of another, linked resource in the cluster; and increasing the cluster relation score for the resource based on the quality score of the another, linked resource. In some aspects, the resource includes a first resource, and the method further includes: identifying a second resource having a highest resource ranking score as a dominant resource. In still other aspects, the name context includes one or more of a name of a book, a name of a product, or a name of a person.

Other embodiments of one or more of the foregoing aspects of the subject matter described in this specification include corresponding systems, apparatus, and computer programs, configured to perform the actions of the methods, encoded on computer storage devices.

Particular embodiments of the subject matter described in this specification can be implemented so as to realize one or more of the following advantages, including, e.g., the ranking of people search results that include people clusters and profiles, book clusters, product clusters, and so forth. Other advantages of the subject matter described in this specification include increased efficiency of searching clusters for resources that are relevant to a search query and increased relevancy of search results for a particular person name, when the person name is associated with multiple people. Still another advantage of the subject matter described in this specification includes scoring and ranking a strength of a relation between resources in a cluster and a person represented by the cluster. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Described herein is a system for ranking resources within a cluster and ranking clusters in response to a search query. In particular, resources within a cluster are ranked according to a quality score for the resource and a cluster relation score for the resource. The quality score is determined independent of the cluster and is indicative of a quality measure of the resource. The cluster relation score is dependent on the other resources in the cluster and is indicative of an authority of the resource in relation to the other resources in the cluster and to the cluster itself. Clusters are ranked according to a relevance of the resources within the cluster to a search query, and according to the ranking of the resources within the cluster.

Generally, a cluster includes a group of resources that are related to one another, for example, by being associated with a person name. In an example, a user performs a search query for a person, for example, a famous actor. In this example, the system returns a number of results for the person ("person results"). Each of the person results is represented as a cluster that includes profile pages, webpages and/or meta data associated with a person name (e.g., the person name included in the search query). A profile page is a type of webpage that includes information about a person. For example, a profile page for a famous actor may include the official web page for the actor or a web page that lists biographical information for the actor.

Using the methods and apparatus described in this detailed description, resources may be clustered together, without distinguishing between the types of resources in a cluster. In an example, the system clusters together web pages and profile pages, without distinguishing, e.g., "web-based clusters" from "profile-based clusters." Generally, a web-based cluster includes a grouping of web pages. Generally, a profile-based cluster includes a grouping of profile pages. In an example, a cluster may include a mixed cluster that includes a mix of resources, including, e.g., a profile page, a web page, and so forth.

In an example, given a user query for a person name (e.g., "John Smith"), the system accesses clusters of resources associated with the person name. In an example, the John Smith person name may belong to multiple John Smiths, including, e.g., a famous actor named John Smith, a famous athlete named John Smith, a politician named John Smith, and so forth. In this example, clusters of resources are retrieved for each of the John Smith person names. The resources within a cluster are ranked and the clusters are ranked relative to each other. Data describing the ranked clusters and, for each ranked cluster, one or more of the ranked resources within the cluster, are returned to the user. These features are described in more detail below.

Figure 1:
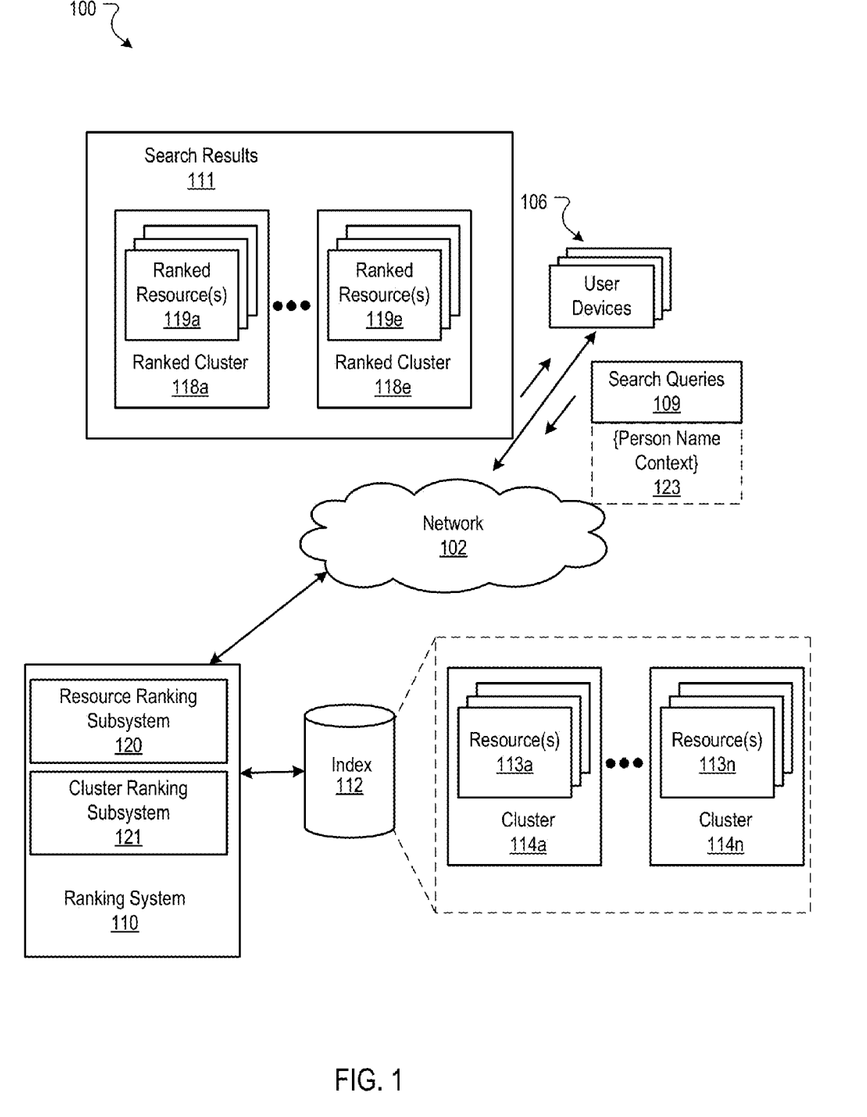
FIG. 1 is a block diagram of an example environment in which a ranking system ranks clusters and resources.

FIG. 1 is a block diagram of an example environment 100 in which a ranking system 110 ranks clusters and resources. The example environment 100 includes a network 102, e.g., a local area network (LAN), a wide area network (WAN), the Internet, or a combination of them, that connects user devices 106 and the ranking system 110. The environment 100 may include many thousands of user devices 106.

A user device 106 is an electronic device that is under control of a user and is capable of sending search queries 109 and receiving search results 111 over the network 102. Example user devices 106 include personal computers, mobile communication devices, and other devices that can send and receive data over the network 102. A user device 106 typically includes a user application, e.g., a web browser, to facilitate the sending and receiving of data, including, e.g., search queries 109 and search results 111, over the network 102.

The user devices 106 submit search queries 109 to the ranking system 110. Search queries 109 may include a person name context 123. Generally, person name context 123 may include a person name portion and a context portion. The person name portion explicitly includes a name of a person to be searched. The context portion implicitly specifies an identity of a person to be searched. By combining the person name portion with the context portion into the person name context 123, a user is able to search for a name of a person in a specific context.

Accordingly, a person name context 123 is a context that either explicitly specifies a person name or implicitly specifies a person name. For example, the query "John Smith" specifies the name John Smith; the query "American explorers" implicitly specifies the names of the American explorers; the query "John Smith author" specifies the names of authors who are named John Smith.

In another example, the person name context 123 can include a name of an entity, a concept, or combinations thereof. Generally, an entity includes a feature that is independent of a person, including, e.g., a topic, an institution, company, corporation, partnership, government agency, university, and so forth, or any other organization which is distinguished from individuals.

In response to search queries 109, the ranking system 110 accesses an index 112 that stores data describing clusters 114, each of which includes respective resources 113. Based on the person name context 123 of the search query 109, the ranking system 110 retrieves from index 112 data describing the clusters 114 and resources 113 that are relevant to the query.

The ranking system 110 includes a resource ranking subsystem 120 and a cluster ranking subsystem 121. In response to receiving a query with person name context 123, the resource ranking subsystem 120 is configured to generate a ranking for the resources in each of the clusters. Likewise, the clusters are also ranked in response to the query. The cluster ranking subsystem 121 generates data defining ranked clusters 118, and, for each of the ranked clusters, data describing the ranked resources 119 in each respective cluster. The data are provided to the user device 106 in the form of search results 111. This ranking process is described in more detail below.

Figure 2A:
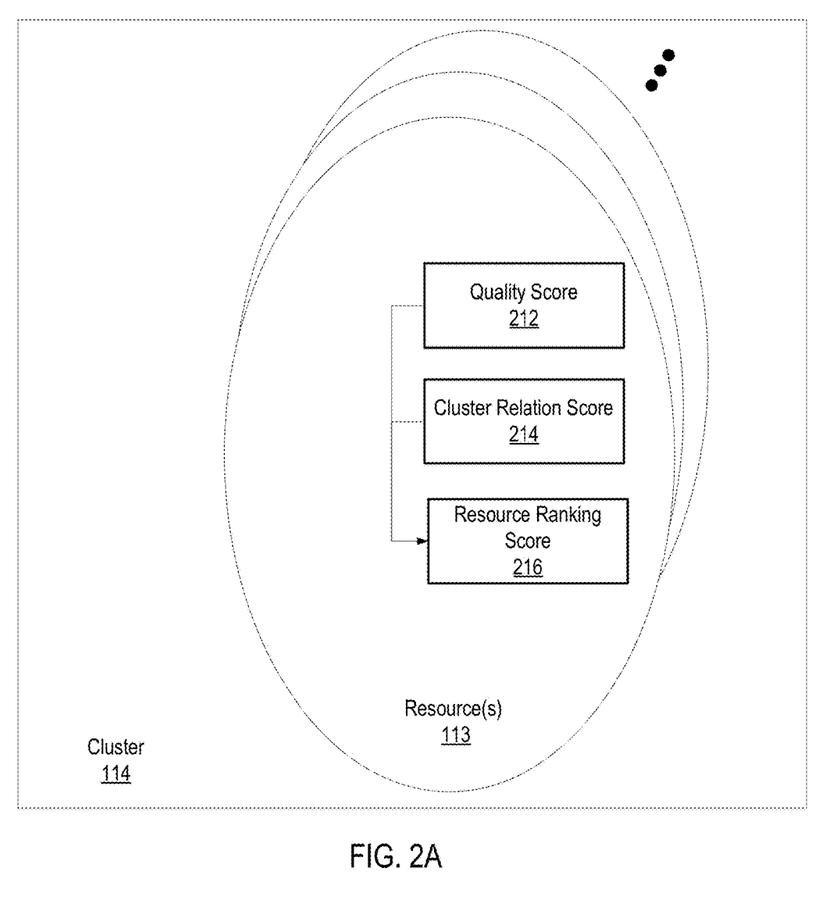
FIG. 2A is a diagram of example components used in generating data defining ranked resources within a cluster.

In some implementations, the resource ranking subsystem 120 generates a resource ranking score for each of the resources 113 in a cluster 114, based on a quality score for the resource and a cluster relation score for the resource. As shown in FIG. 2A, for example, cluster 114a includes resources 113a. Each of the resources 113a in cluster 114a is associated with a quality score 212 and a cluster relation score 214. The quality scores 212 and cluster relation scores 214 are generated by the resource ranking subsystem 120 using the techniques described herein. The resource ranking subsystem 120 determines a resource ranking score 216 at least partly based on the quality score 212 and the cluster relation score 214.

Generally, a quality score 212 specifies a quality measure of the resource and is independent of the inclusion of the resource in the cluster and is independent of the inclusion of other resources in the cluster. For example, a resource that is spam is associated with a low quality score independent of the cluster to which the spam resource belongs.

Generally, a cluster relation score 214 measures an authority (e.g., connectivity and/or importance) of the resource in relation to other resources in the cluster. For example, a very high quality article resource about a famous actor belonging to a cluster for the famous actor may be referenced by multiple links in other resources that belong to the cluster. Accordingly, the article resource will have a high cluster relation score for that cluster.

The cluster relation score 214 for a resource is applicable to the cluster to which the resource belongs. If the resource belongs to two or more clusters, the resource will then have a corresponding cluster relation score for each cluster. For example, assume the article described above incidentally mentions a famous athlete, and is thus included in a cluster for the famous athlete. The article, however, is not referenced by many other pages in the cluster for the famous athlete. Accordingly, the article may have low cluster relation score for a cluster associated with the famous athlete.

The cluster relation score and quality scores are described in more detail below.

The cluster relation score 214 may be based on an authority score according to an authority graph. In an example, an authority graph includes a graph in which the resources of a cluster represent the nodes of the graph and weights assigned to edges between the nodes represent the connectivity between the resources.

In an example, a cluster includes a particular resource ("R"). If other resources in the cluster inwardly point (e.g., inlinks to) to R, then R has a higher cluster relation score 214 than if R outwardly pointed (e.g., outlinks to) to other resources in the cluster. In an example, if the links are new, then R is associated with a relatively low cluster relation score 214, at least because new links may not be trustworthy. In another example, if links to R are old, then R is associated with a relatively higher cluster relation score 214, at least because old links are indicative of trustworthiness (e.g., authority). In an example, links are determined to be "new" or "old" based on a time metric associated with the links. In this example, the time metric includes information specifying a number of days that have elapsed subsequent to generation of the link. Additionally, a comparison of the time metric to a time threshold metric may determine whether the link is new or old. In this example, when a value of the time metric exceeds the threshold metric, the link is determined to be "old." In another example, when a value of the time metric is less than the threshold metric, the link is determined to be "new."

Additionally, if R and other resources in the cluster include common topics, then R is assigned a relatively high cluster relation score 214 to indicate that R may be representative of the topic of the cluster. In yet another example, the resources of a cluster are associated with an increased cluster relation score 214 when authenticated links exist between resources in a cluster. Generally, an authenticated link is a link that has been verified as pertaining to a particular person name context. For example, a link may be authenticated by an individual viewing content associated with the link and sending data to the ranking system 110 that indicates that the link points to the person name context that is associated with the link. In this example, a particular profile page in a cluster is linked to another, different profile page in the cluster. The link is indicative of a high level of connectivity between the different profiles and accordingly each profile page is associated with an increased cluster relation score 214.

Additionally, the size of a cluster may also affect cluster relation scores. For example, resources in a smaller sized cluster may have a different (e.g., an increased) cluster relation scores relative to resources in larger clusters due to the increased level of connectively among the resources. Conversely, the connectivity score can be scaled in inverse proportion to the size of the cluster, as vary small clusters may be susceptible to scoring noise.

The examples above are examples of several factors that can be evaluated when generating cluster relation scores 214. Additional factors, or fewer factors, or modification to the factors described herein can be considered when generating cluster relation scores 214.

A quality score 212 is generated from various metrics, including, e.g., information retrieval ("IR") scores. In an example, IR scores compute a relevance of a resource for a given person name to which the cluster is associated. For example, the IR scores can be computed from dot products of feature vectors corresponding to a search query 109 and a resource. The quality score 212 may also be generated from resource properties and attributes, including, e.g., a number of clusters to which a resource belongs, a name of a resource, an age of the resource, an authority score of the resource relative to other resources that include both resources that belong to the cluster and resources that do not belong to the cluster, a spam score of the resource, classification tags of the resource, and so forth.

The quality score 212 may also be based on reputation information, including, e.g., whether a resource is a profile page associated with followers associated with high-quality resources (e.g., the profile page is followed by a prominent entertainment web site), whether the resource is authored by a blogger and the blogger has been authenticated and deemed trustworthy, and so forth.

Reputation information may also include normalized quality scores (and/or cluster relation scores) among resources from a same site (e.g., a web site). For example, a cluster may include multiple resources from the same web site. In this example, each of the multiple resources is assigned a quality score 212 (and/or cluster relation score) that reflects the association between the resources and the web site.

The quality score 212 (and/or cluster relation score) may also be indirectly based on reputation information, for example, through conflicts. A conflict exists when two or more resources in a cluster are of the same type of resource. In an example, if multiple profile documents of the same kind belong to a cluster, then the multiple profile documents are in conflict with each other. For resources that are in conflict, resource ranking subsystem 120 identifies and penalizes conflicting resources, including, e.g., resources that are considered mutually exclusive for a given person name.

In this example, each of the conflicting profile documents in the cluster will have a lower quality score than a profile document that is the only profile document for a cluster. For example, if a cluster includes twenty profile pages for the same person, then each of these accounts will be associated with a relatively low quality score to indicate the duplicative nature of the profile pages. In this example, if all of the profile pages are roughly equal in quality and connectedness, then the quality scores 212 of the profile pages will be heavily penalized. However, if one of the profile pages is much higher in quality (e.g., the "real" John Smith actor profile, which has many inlinks and followers), then the quality score of the high quality profile page is not penalized.

The quality score 212 may also be based on whether a resource is identified by the resource ranking subsystem 120 as spam. When the resource ranking subsystem 120 identifies a resource as spam, the resource ranking subsystem 120 assigns the spam resource a relatively low quality score.

The quality score 212 may also be based on a verification of a resource as a real resource. In an example, an agent may call an party associated with the ranking system 110 and inform the party that a particular resource represents the real profile for a particular person name. In this example, the resource representing the real profile is assigned a relatively high quality score 212 to reflect the fact that the resource has been authenticated and verified. Other verification techniques can also be used, such as digital signatures, for example. The quality score 212 may also be based on the age of a resource. In an example, newer pages may be associated with a lower quality score 212 to reflect a fact that the newer pages are less likely to have been authenticated and verified.

In some implementations, generating the cluster relation score, the quality scores are propagated among connected resources in a cluster. In an example, a cluster includes two resources, resource A and resource B. In this example, resource A is associated with a high quality score. Resource A also points to another resource in the cluster, namely, resource B. In this example, resource B "receives" some of the quality score of resource A, for example, by increasing the cluster relation score of resource B.

In another example, the cluster includes two other resources, resource C and resource D. In this example, resource C points to resource D. Resource D is associated with a relatively low quality score. Accordingly, resource C receives some of the quality score for resource D, for example, by decreasing the cluster relation score of resource C.

The resource ranking subsystem 120 generates the resource ranking score 216 at least partly based on the cluster relation score and the quality score. The resource ranking score 216 specifies a relevance of a resource to the person name context 123 included in search query 109. As illustrated in FIG. 2A, the resource ranking score 216 is based on a relationship between the cluster relation score 214 and the quality score 212. The relationship may include an additive relationship, in which the resource ranking score 216 is generated by adding the cluster relation score 214 to the quality score 212. In another example, the relationship includes a multiplicative relationship in which the resource ranking score 216 is generated by multiplying the cluster relation score 214 by the quality score 212.

In yet another example, the relationship includes a linear weighted regression. In this example, the cluster relation score 214 is assigned a weight and the cluster relation score 214 is multiplied by the weight to determine a weighted cluster relation score. Additionally, the quality score 212 is assigned a weight and the quality score 212 is multiplied by the weight to determine a weighted quality score. The resource ranking subsystem 120 generates the resource ranking score 216 by adding the weighted cluster relation score to the weighted quality score. The weights may be based on a relative importance of the quality score and/or the cluster relation score in determining the resource ranking score.

In another example, the resource ranking subsystem 120 may generate the resource ranking score 216 using any combination of the relationships described herein (e.g., by adding the quality score to the cluster relation score). The resource ranking subsystem 120 may then increase or decrease a value of the resource ranking score based on attributes of the resources (e.g., IR scores, resource properties, conflicts, and so forth). In an example, when a resource conflicts with another resource, the resource ranking scores of the conflicting resources are each decreased by a predetermined amount. In a variation of this example, the quality scores of the conflicting resources may be reduced by the predetermined amount and the resource ranking score is calculated using any of the techniques described herein.

Figure 2B:
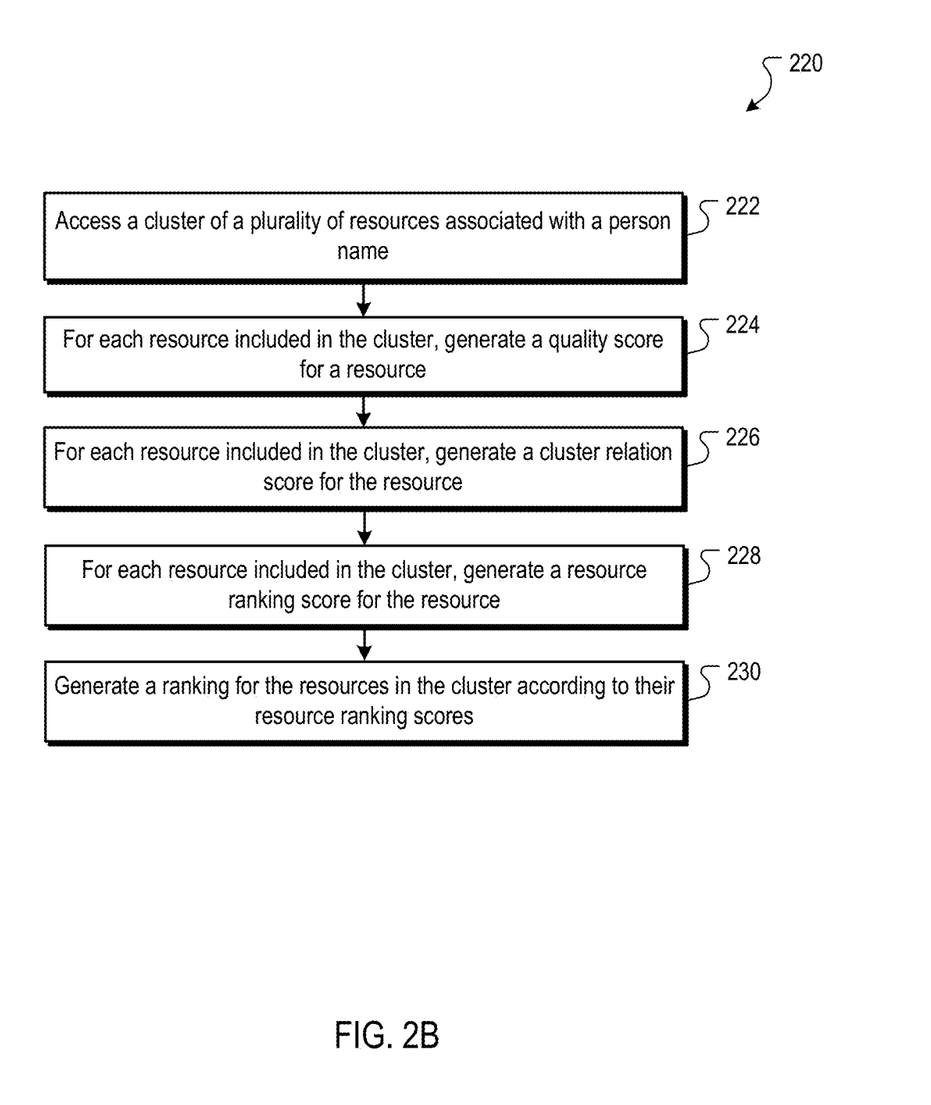
FIG. 2B is a flow diagram of an example process for generating data defining ranked resources within a cluster.

FIG. 2B is a flow diagram of an example process 220 for generating data defining ranked resources within a cluster. In operation, the ranking system 110 accesses a cluster 114 of a plurality of resources 113 associated with a person name context 123 (222). For each resource 113 included in the cluster 114, the resource ranking subsystem 120 generates a quality score for a resource 113 (224), as described above. As illustrated in FIG. 2A, for example, resource 113 in cluster 114 is associated with a quality score 212.

For each resource 113 included in the cluster 114, the resource ranking subsystem 120 generates a cluster relation score for the resource 113 (226), as described in above. As illustrated in FIG. 2A, resource 113 is also associated with a cluster relation score 214. The cluster relation score 214 may be at least partly based on the quality score 212 of a resource 113 through the quality propagation technique described above.

For each resource 113 included in the cluster 114, the resource ranking subsystem 120 generates a resource ranking score for the resource 113 (228), for example, as described above. As illustrated in FIG. 2A, the resource ranking score 216 may be at least partly based on the quality score 212 and on the cluster relation score 214. The resource ranking subsystem 120 generates a ranking for the resources 113 in the cluster 114 according to their resource ranking scores (230).

In an example, a resource that is a highest ranked resource relative to the other resources in a cluster is referred to as a dominant resource. In an example, a user submits a person search for "John Smith." In this example, an authoritative page on John Smith the explorer may be the highest ranked page resource relative to other page resources for John Smith. Accordingly, the authoritative page on John Smith the explorer is the dominant page. In another example, resources may be ranked within a cluster without a query being performed by a user.

In response to the query 109, the ranking system 110 retrieves clusters 114 that each include resources 113. The cluster ranking subsystem 121 is configured to score and to rank these clusters 114 according to a relevance of the clusters 114 to the query 109 that includes the person name context 123. In particular, the cluster ranking subsystem 121 generates a cluster rank score for each of the clusters 114. The cluster rank score specifies a relevance of a cluster to the person name context of the query 109. To generate a cluster rank score for a cluster, the cluster ranking subsystem 121 computes a baseline score for the cluster by combining the resource ranking scores and the search scores of the resources in the cluster.

Figure 3A:
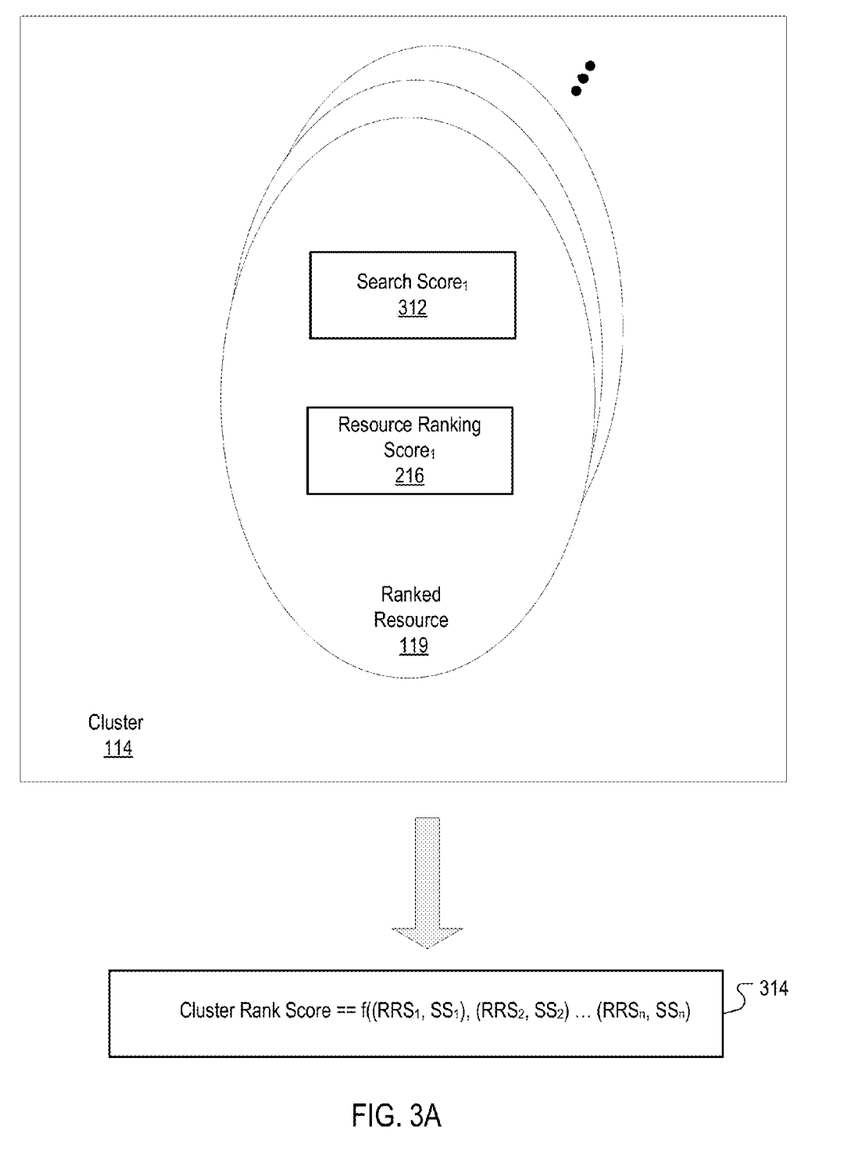
FIG. 3A is a diagram of example components used in generating data defining ranked clusters.

For example, as illustrated in FIG. 3A, cluster 114 includes ranked resources, including, e.g., ranked resource 119. The ranked resources 119 are associated with resource ranking scores ("$RRS_1 \ldots RRS_n$"), including, e.g., resource ranking score 216, as described above. The ranked resources 119 are also associated with search scores ("$SS_1 \ldots SS_n$"), including, e.g., search score 312. The search score 312 is a score that is proportional to a relevance of the resource to the query 109. For example, the search score 312 can be an IR score that measures the relevance of the resource to the query 109. In the example of FIG. 3A, the cluster rank score 314 is generated based on a function of the resource ranking scores 216 ("$RRS_1 \ldots RRS_n$") and the search scores 312 ("$SS_1 \ldots SS_n$") of the ranked resources 119 in the cluster 114.

As previously addressed, to generate a cluster rank score 314 for a cluster 114, the cluster ranking subsystem 121 computes a baseline score for the cluster by combining the resource ranking scores 216 and the search scores 312 of the resources in the cluster.

In an example, a cluster ("cluster A") is associated with a particular search score. Another cluster ("cluster B") is associated with the same particular search score. In this example, cluster A has a higher resource ranking score than cluster B, for example, because cluster A includes more resources or higher ranking resources. Accordingly, cluster A receives a higher baseline score than cluster B (e.g., a cluster with fewer higher ranked resources), even though the search scores for clusters A and B are the same.

Contribution of the resource ranking scores 216 (e.g., via a weighting of the resource ranking scores) to the cluster ranking scores 314 (and to the baseline score) depends on a number of attributes, including, e.g., a strength of the relation between the resource and the cluster, diversity of the resources for a given cluster, and so forth, as described in further detail below. Additionally, the cluster ranking subsystem 121 adjusts the baseline score of a cluster, for example, based on a name-match between a name of a person represented by the cluster and the search query 109, social affiliation between a user submitting query 109 and the person represented by the cluster, localization or personalization signals, and so forth.

The cluster ranking subsystem 121 generates the cluster rank score 314 at least partly based on the resource ranking score, the search score, and, in some examples, the attribute score, as described below. In particular, the cluster rank score 314 is based on a relationship between the resource ranking score 216, the search score 312, and, in some examples, the attribute score. The relationship may include an additive relationship, in which the cluster rank score is generated by adding the resource ranking score to the search score and to the attribute score for a cluster. In another example, the relationship includes a multiplicative relationship in which the cluster rank score is generated by multiplying the resource ranking score by the search score and by the attribute score for a cluster.

In yet another example, the relationship includes a linear weighted regression. In this example, the resource ranking score 216 is assigned a weight, the resource ranking score 216 is multiplied by the weight to determine a weighted resource ranking score. Additionally, the search score 312 is assigned a weight and the search score 312 is multiplied by the weight to determine a weighted search score. The attribute score is assigned a weight and the attribute score is multiplied by the weight to determine a weighted attribute score. The cluster ranking subsystem 121 generates the cluster rank score 314 by adding the weighted resource ranking score to the weighted search score and to the weighted attribute score. The weights may be based a relative importance of the resource ranking score, the search score and the attribute score in determining the cluster ranking score.

In another example, the cluster ranking subsystem 121 may generate a baseline score using any combination of the relationships described herein (e.g., by adding the resource ranking score to the search score). The cluster ranking subsystem 121 may then increase or decrease a value of the baseline score, based on attributes of the clusters (e.g., IR scores, geographic location, social connection, and so forth), to generate cluster rank score 314.

In an example, the cluster ranking subsystem 121 is configured to determine social connections between a searcher and clusters. In this example, cluster ranking subsystem 121 may be configured to receive and/or access an account of the searcher to determine one or more social networks with which the consumer is a member and/or has a connection. Generally, a social network includes an online community of users. In another example, a social network includes a social structure made up of individuals (or organizations) called "nodes", which are tied (connected) by one or more specific types of interdependency, such as friendship, kinship, common interest, financial exchange, dislike, or relationships of beliefs, knowledge or prestige. The cluster ranking subsystem 121 may be configured to receive and/or retrieve information specifying names of social networks with which searcher is connected. In another example, the user may input into the cluster ranking subsystem 121 information indicative of social networks of which the user is a member.

In this example, the cluster ranking subsystem 121 is also configured to determine social connections (via affiliations and/or connections to social networks) associated with a person represented by a particular cluster. In this example, when the cluster ranking subsystem 121 determines a match between a social network to which the search has a connection and a social network to which a person represented by the cluster has a connection, the resource ranking score 216 is generated by increasing the baseline score by a predetermined amount.

In particular, the attribute score may indicate that the cluster rank score 314 is generated by increasing the baseline score. In a variation of this example, when a cluster fails to have a social connection to the searcher, the baseline score of the cluster is reduced by the predetermined amount. In particular, the attribute score may indicate that the cluster rank score 314 is generated by reducing the baseline score.

Figure 3B:
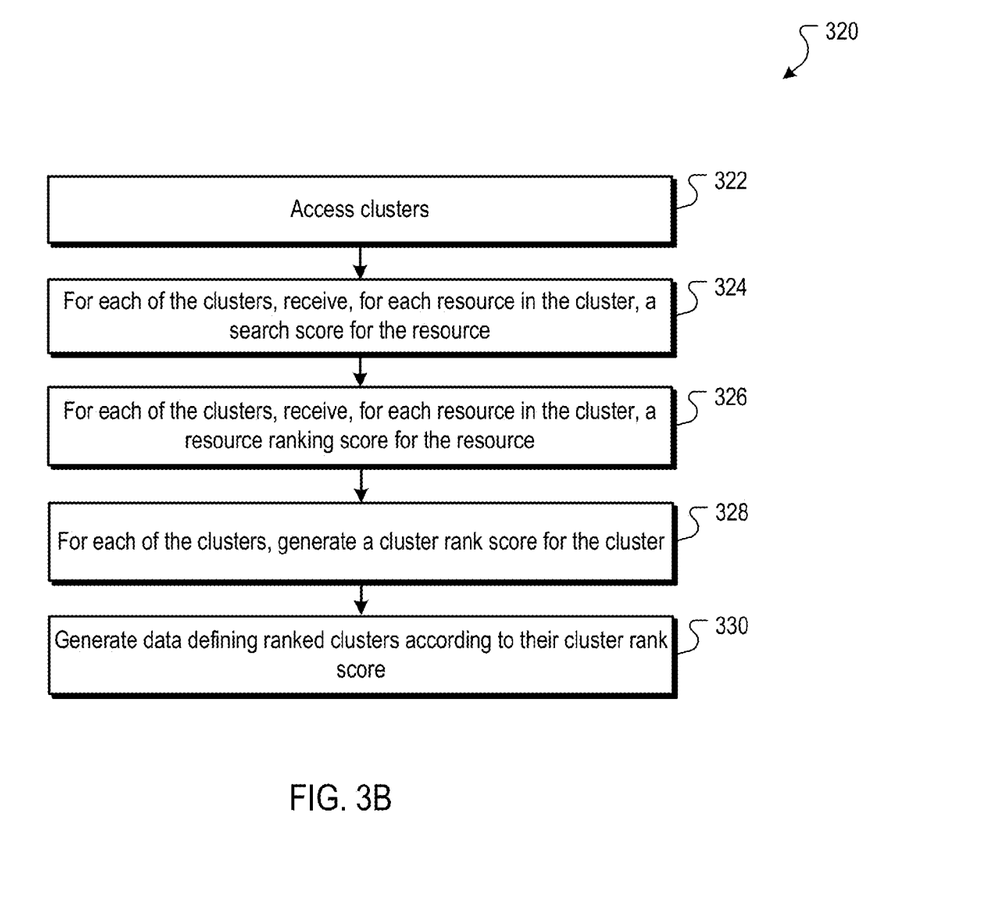
FIG. 3B is a flow diagram of an example process for generating data defining ranked clusters.

FIG. 3B is a flow diagram of an example process 320 for ranking clusters. In operation, the ranking system 110 accesses clusters 114 (322). In this example, while the clusters 114 themselves are unranked, the clusters 114 include resource ranking scores 216 for the resources 119. For each of the clusters 114, the cluster ranking subsystem 121 receives for each resource 119 in the cluster 114 a search score 312 for the resource 119 (324), as described above. For each of the clusters 114, the cluster ranking subsystem 121 receives for each resource 119 in the cluster 114 a resource ranking score 216 for the resource 119 (326), as described above. For each of the clusters 114, the cluster ranking subsystem 121 generates a cluster rank score 314 for the cluster 114 (328), as described above.

As illustrated in FIG. 3A, the cluster rank score 314 is at least partly based on the search score 312, the resource ranking score 216, and, in some implementations, attribute scores that are indicative of attributes and/or characteristics of the clusters, as described in below. In particular, the cluster ranking subsystem 121 may generate a baseline score based on the resource ranking score 216 and the search score 312. The cluster ranking subsystem 121 may generate the cluster rank score 314 by adjusting the baseline score based on the attribute scores. The cluster ranking subsystem 121 generates data defining ranked clusters 118 according to their cluster rank scores 314 (330).

As previously described, a baseline score is calculated by combining the resource ranking score with the search scores, for example, according to a pre-defined relationship as described in further detail below. The baseline score may then be adjusted based on one or more attribute scores.

Generally, an attribute score includes a value indicative of a characteristic of a cluster, including, e.g., a name-match between a name of a person represented by the cluster and the search query 109, a social affiliation of a user submitting query 109 and a person represented by a cluster, localization or personalization signals, number of resources in the cluster, whether a number of resources in a cluster are associated with a same host/domain, and so forth.

Figure 4:
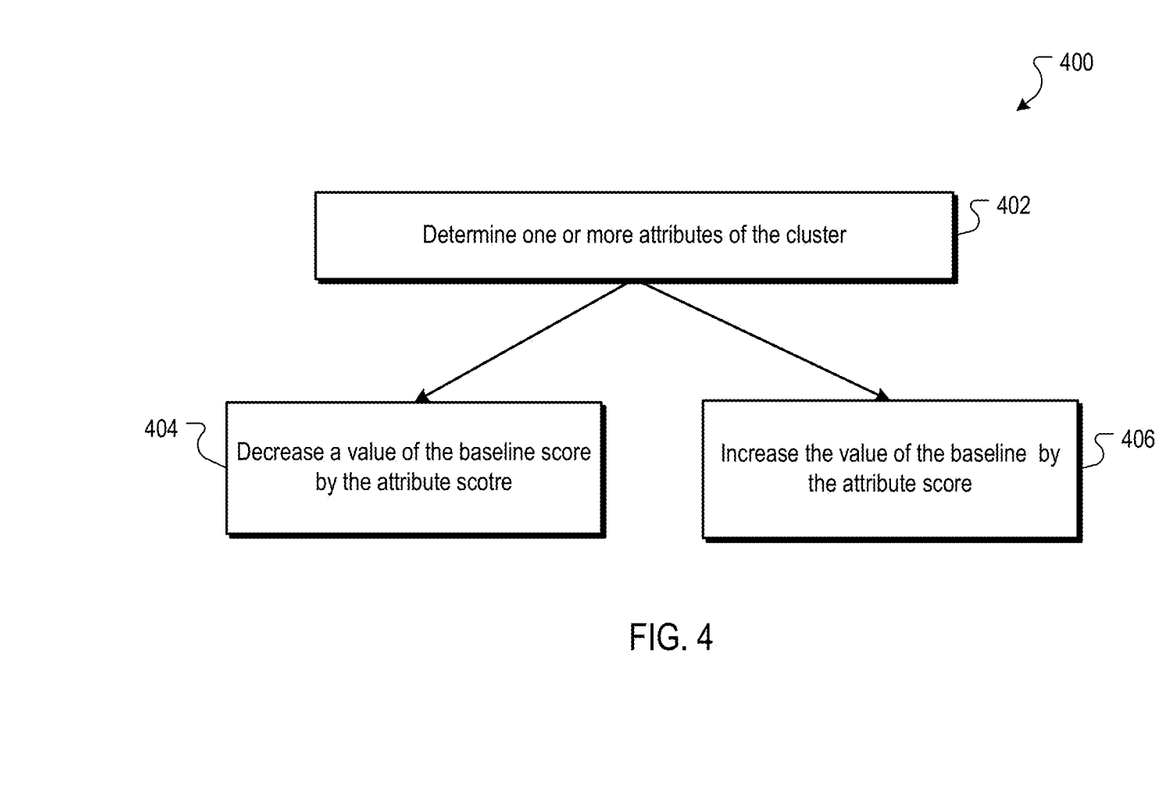
FIG. 4 is a flow diagram of an example process for generating a cluster rank score using attribute scores.

FIG. 4 is a flow diagram of an example process 400 for generating a cluster rank score using attribute scores. In operation, the cluster ranking subsystem 121 determines one or more attributes of the cluster and generates attribute scores based on the determined attributes (402). When the attribute score includes a negative value, the cluster ranking subsystem 121 decreases a value of the baseline score by the attribute score to generate the cluster ranking score (404). When the attribute score includes a positive value, the cluster ranking subsystem 121 increases a value of the baseline score by the attribute score to generate the cluster ranking score (406).

Attribute scores may also be based on the authority rank of the resources in a cluster, and IR for the query of the resources in the cluster. In an example, some query terms primarily influence the ranking of clusters, while other query terms primarily influence the ranking of resources within clusters. Attribute scores may be based on an analysis of connectivity of resources within a cluster, e.g., by using the authority score described herein. Attribute scores may also be based on spam signals, for example, when the cluster ranking subsystem 121 determines that a portion of the resources in a cluster include spam.

Attribute scores may also be based on a social connection between the person name context 123 in the search query 109 and the user submitting the query. The social connection may include mutual friends, a social network, organizations to which the searcher belongs, and so forth. In an example, a user searches for the person name "John Johnson." In this example, the cluster ranking system 121 analyzes a social connection between the user and returned clusters, for example, to determine if any of the clusters include information pertaining to a friend or friends of friends of the user searching the profile.

In this example, the search for "John Johnson" returns two clusters, a cluster for a famous actor John Johnson and a cluster for a school superintendent John Johnson. The cluster ranking subsystem 121 scans social profiles in a social network of the user submitting the query, social profiles of the famous actor John Johnson and social profiles of the school superintendent John Johnson. The cluster ranking subsystem 121 determines that the user submitting the query is connected to (e.g., is a friend of) the superintendent John Johnson. Based on the social connection, the cluster ranking subsystem 121 generates an attribute score to reflect the connection, e.g., by increasing a value of the attribute score. Accordingly, the cluster for the superintendent John Johnson should be ranked above the famous actor John Johnson.

In particular, the cluster for the superintendent John Johnson may receive a positive attribute score. If resource ranking scores are ranked such that clusters with higher ranking scores are ranked above clusters with lower ranking scores, then assigning the cluster for the superintendent John Johnson a positive attribute score increases a probability of this cluster ranking above the cluster for the actor John Johnson.

Attribute scores may also be based on geographic information (e.g., geographic location information, state information, country information, and so forth) of the searcher and geographic information associated with the person name context 123 included in search query 109. In an example, when an estimated distance between a searcher location and a location associated with a person name for a cluster is small (e.g., less than 500 miles), the distance should have an increased impact on the ranking of the clusters. For example, if a user searches for "Lolly Lag," three clusters associated with the person name "Lolly Lag" are returned. In this example, the cluster ranking subsystem 121 scans each of the clusters for geographic information to determine a geographic location for each of the "Lolly Lag" people associated with a cluster. The "Lolly Lag" cluster associated with a geographic location that is closest to the searcher is assigned a relatively large attribute score to increase a probability that this cluster is ranked above the other clusters. In another example, when the distance between the searcher and a person associated with a cluster is large, the geographic distance may not impact the ranking of the clusters.

Attribute scores may also be based on nickname and synonym expansion (e.g., Bob, Bobby, Robby, Rob, Robert). In particular, the similarity of a searched person name and the person name of a cluster influences the ranking of clusters. In an example, a person name for a cluster is similar to a searched person name. In this example, the cluster receives a relatively high attribute score to reflect the similarity between the person name for the cluster and the searched person name. The relatively high attribute score (e.g., relative to other clusters) increases a probability that the cluster with the person name that is similar to the searched person name ranks high in the search result.

The inclusion and/or exclusion of a middle name or initial in the person name of a cluster may also influence the attribute score of a cluster. In an example, the searched person name includes a middle initial. In this example, clusters associated with person names including the middle initial are associated with a higher attribute score than clusters associated with people names without the middle initial. In another example, the uniformity of name appearance within a cluster also influences the cluster's ranking, e.g., for queries that aren't exact matches with the searched person name.

The attribute score may be based on any combination of the foregoing attributes. In an example, the attributes included in the attribute score may be assigned varying weights. In this example, the attribute score for a cluster may be based on geographic information and social connection. A strength of a social connection may account for 70% of the attribute score and a strength of geographic location may account for the remaining 30% for the attribute score.

Using the techniques described herein, a set of people results may be ranked according to a relevance of the people results to a person name context in a search query. Additionally, individual resources (e.g., profile pages) within a person result may also be ranked for the person result, e.g., according to a relevance of the individual resources to the searched person name context.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    accessing a cluster of a plurality of resources associated with a name context;
    generating a quality score for a resource, the quality score being independent of inclusion of the resource in the cluster and independent of inclusion of other resources in the cluster and indicative of a quality measure of the resource;
    generating a cluster relation score for the resource, the cluster relation score being dependent on the other resources in the cluster and indicative of an authority of the resource relative to authorities of the other resources in the cluster;
    generating a resource ranking score for the resource, with the resource ranking score at least partly based on the quality score and the cluster relation score; and
    ranking the resources in the cluster at least partly based on the resource ranking score.

2. The computer-implemented method of claim 1, wherein the quality score is at least partly based on one or more of a relevance of the resource to the name context, an age attribute of the resource, an authority attribute of the resource, a spam score associated with the resource, and a number of other clusters to which the resource belongs.

3. The computer-implemented method of claim 1, wherein the resource comprises a first resource, and wherein the cluster relation score is at least partly based on a connectivity of the first resource to a second resource in the cluster.

4. The computer-implemented method of claim 1, wherein the resource comprises a first resource, and wherein the cluster relation score is at least partly based on a conflict between the first resource and a second resource in the resources of the cluster, wherein a conflict occurs when the first resource is of a particular resource type and the second resource is of the same, non-duplicative resource type.

5. The computer-implemented method of claim 1, wherein generating the resource ranking score comprises:
    applying a linear weighted regression to the quality score and to the cluster relation score, wherein the linear weighted regression comprises an additive function in which (a) the quality score is multiplied by a first weight, (b) the cluster relation score is multiplied by a second weight value, and (c) a value of the quality score multiplied by the first weight is added to a value of the cluster relation score multiplied by the second weight.

6. The computer-implemented method of claim 1, wherein generating the resource ranking comprises one or more of:
    decreasing the cluster relation score for the resource based on a quality score of another, linked resource in the cluster; and
    increasing the cluster relation score for the resource based on the quality score of the other, linked resource.

7. The computer-implemented method of claim 1, where the resource comprises a first resource, and wherein the method further comprises:
    identifying a second resource having a highest resource ranking score as a dominant resource.

8. The computer-implemented method of claim 1, wherein the name context comprises one or more of a name of a book, a name of a product, or a name of a person.

9. One or more computer storage media configured to store instructions that are executable by one or more processing devices to perform operations comprising:
    accessing a cluster of a plurality of resources associated with a name context;
    generating a quality score for a resource, the quality score being independent of inclusion of the resource in the cluster and independent of inclusion of other resources in the cluster and indicative of a quality measure of the resource;
    generating a cluster relation score for the resource, the cluster relation score being dependent on the other resources in the cluster and indicative of an authority of the resource relative to authorities of the other resources in the cluster;
    generating a resource ranking score for the resource, with the resource ranking score at least partly based on the quality score and the cluster relation score; and
    ranking the resources in the cluster at least partly based on the resource ranking score.

10. The one or more computer storage media of claim 9, wherein the quality score is at least partly based on one or more of a relevance of the resource to the name context, an age attribute of the resource, an authority attribute of the resource, a spam score associated with the resource, and a number of other clusters to which the resource belongs.

11. The one or more computer storage media of claim 9, wherein the resource comprises a first resource, and wherein the cluster relation score is at least partly based on a connectivity of the first resource to a second resource in the cluster.

12. The one or more computer storage media of claim 9, wherein the resource comprises a first resource, and wherein the cluster relation score is at least partly based on a conflict between the first resource and a second resource in the resources of the cluster, wherein a conflict occurs when the first resource is of a particular resource type and the second resource is of the same, non-duplicative resource type.

13. The one or more computer storage media of claim 9, wherein generating the resource ranking score comprises:
    applying a linear weighted regression to the quality score and to the cluster relation score, wherein the linear weighted regression comprises an additive function in which (a) the quality score is multiplied by a first weight, (b) the cluster relation score is multiplied by a second weight value, and (c) a value of the quality score multiplied by the first weight is added to a value of the cluster relation score multiplied by the second weight.

14. The one or more computer storage media of claim 9, wherein generating the resource ranking comprises one or more of:
    decreasing the cluster relation score for the resource based on a quality score of another, linked resource in the cluster; and
    increasing the cluster relation score for the resource based on the quality score of the other, linked resource.

15. The one or more computer storage media of claim 9, where the resource comprises a first resource, and wherein the operations further comprise:
   identifying a second resource having a highest resource ranking score as a dominant resource.

16. The one or more computer storage media of claim 9, wherein the name context comprises one or more of a name of a book, a name of a product, or a name of a person.

17. An electronic system comprising:
   one or more processing devices; and
   one or more machine-readable media configured to store instructions that are executable by the one or more processing devices to perform operations comprising:
      accessing a cluster of a plurality of resources associated with a name context;
      generating a quality score for a resource, the quality score being independent of inclusion of the resource in the cluster and independent of inclusion of other resources in the cluster and indicative of a quality measure of the resource;
      generating a cluster relation score for the resource, the cluster relation score being dependent on the other resources in the cluster and indicative of an authority of the resource relative to authorities of the other resources in the cluster;
      generating a resource ranking score for the resource, with the resource ranking score at least partly based on the quality score and the cluster relation score; and
      ranking the resources in the cluster at least partly based on the resource ranking score.

18. The electronic system of claim 17, wherein the quality score is at least partly based on one or more of a relevance of the resource to the name context, an age attribute of the resource, an authority attribute of the resource, a spam score associated with the resource, and a number of other clusters to which the resource belongs.

19. The electronic system of claim 17, wherein the resource comprises a first resource, and wherein the cluster relation score is at least partly based on a connectivity of the first resource to a second resource in the cluster.

20. The electronic system of claim 17, wherein the resource comprises a first resource, and wherein the cluster relation score is at least partly based on a conflict between the first resource and a second resource in the resources of the cluster, wherein a conflict occurs when the first resource is of a particular resource type and the second resource is of the same, non-duplicative resource type.

21. The electronic system of claim 17, wherein generating the resource ranking score comprises:
   applying a linear weighted regression to the quality score and to the cluster relation score, wherein the linear weighted regression comprises an additive function in which (a) the quality score is multiplied by a first weight, (b) the cluster relation score is multiplied by a second weight value, and (c) a value of the quality score multiplied by the first weight is added to a value of the cluster relation score multiplied by the second weight.

22. An electronic system comprising:
   means for accessing a cluster of a plurality of resources associated with a name context;
   means for generating a quality score for a resource, the quality score being independent of inclusion of the resource in the cluster and independent of inclusion of other resources in the cluster and indicative of a quality measure of the resource;
   means for generating a cluster relation score for the resource, the cluster relation score being dependent on the other resources in the cluster and indicative of an authority of the resource relative to authorities of the other resources in the cluster;
   means for generating a resource ranking score for the resource, with the resource ranking score at least partly based on the quality score and the cluster relation score; and
   means for ranking the resources in the cluster at least partly based on the resource ranking score.

23. A computer-implemented method comprising:
   accessing a cluster of a plurality of resources associated with a name context;
   generating a quality score for a resource, the quality score being independent of inclusion of the resource in the cluster and independent of inclusion of other resources in the cluster and indicative of a quality measure of the resource;
   generating a cluster relation score for the resource, the cluster relation score being dependent on the other resources in the cluster and indicative of an authority of the resource in relation to the other resources in the cluster;
   generating a resource ranking score for the resource, with the resource ranking score at least partly based on the quality score and the cluster relation score; and
   ranking the resources in the cluster at least partly based on the resource ranking score;
   wherein generating the resource ranking score comprises:
      applying a linear weighted regression to the quality score and to the cluster relation score, wherein the linear weighted regression comprises an additive function in which (a) the quality score is multiplied by a first weight, (b) the cluster relation score is multiplied by a second weight value, and (c) a value of the quality score multiplied by the first weight is added to a value of the cluster relation score multiplied by the second weight.

* * * * *